(12) United States Patent
Refstrup

(10) Patent No.: US 9,495,549 B2
(45) Date of Patent: *Nov. 15, 2016

(54) AUTHENTICATING A REPLACEABLE PRINTER COMPONENT

(71) Applicant: HEWLETT-PACKARD DEVELOPMENT COMPANY, L.P., Houston, TX (US)

(72) Inventor: Jacob Grundtvig Refstrup, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/823,467

(22) Filed: Aug. 11, 2015

(65) Prior Publication Data

US 2015/0343792 A1 Dec. 3, 2015

Related U.S. Application Data

(63) Continuation of application No. 12/995,034, filed as application No. PCT/US2008/065104 on May 29, 2008, now Pat. No. 9,141,816.

(51) Int. Cl.
| | |
|---|---|
| *G06F 3/12* | (2006.01) |
| *G06F 21/60* | (2013.01) |
| *B41J 2/175* | (2006.01) |
| *G06F 21/44* | (2013.01) |
| *G06F 21/57* | (2013.01) |
| *G03G 15/08* | (2006.01) |
| *B41J 29/393* | (2006.01) |

(52) U.S. Cl.
CPC .......... *G06F 21/608* (2013.01); *B41J 2/17546* (2013.01); *G03G 15/0863* (2013.01); *G06F 21/445* (2013.01); *G06F 21/57* (2013.01); *G03G 2215/0697* (2013.01); *G03G 2221/1823* (2013.01)

(58) Field of Classification Search
None
See application file for complete search history.

(56) References Cited

U.S. PATENT DOCUMENTS

| | | | |
|---|---|---|---|
| 6,799,273 B1 | 9/2004 | Oishi et al. | |
| 7,246,098 B1 | 7/2007 | Walmsley | |
| 7,360,131 B2* | 4/2008 | Walmsley | B41J 2/04505 713/162 |
| 2005/0172118 A1* | 8/2005 | Nasu | G03G 21/04 713/156 |
| 2007/0011023 A1 | 1/2007 | Silverbrook | |
| 2007/0160204 A1 | 7/2007 | Kimura et al. | |
| 2008/0052518 A1 | 2/2008 | Newton | |

FOREIGN PATENT DOCUMENTS

| | | |
|---|---|---|
| CN | 1996837 A | 7/2007 |
| JP | 2000-137417 | 5/2000 |

(Continued)

*Primary Examiner* — Marivelisse Santiago Cordero
*Assistant Examiner* — Neil R McLean

(57) ABSTRACT

A replaceable printer component includes a first memory device and a communication link. The first memory device is configured to store a first secret. The communication link is configured to communicatively link the first memory device to a printer controller when the replaceable printer component is installed in a printing system. The printing system comprises a second memory device storing a second secret. The second memory device is communicatively linked to the printer controller. The printer controller is configured to determine an authenticity of the replaceable printer component based on the first secret and the second secret.

13 Claims, 4 Drawing Sheets

(56) References Cited

FOREIGN PATENT DOCUMENTS

| | | |
|---|---|---|
| JP | 2001-215779 | 8/2001 |
| JP | 2002-127550 | 5/2002 |
| JP | 2003-118143 | 4/2003 |
| JP | 2005-151175 | 6/2005 |
| JP | 2005260489 A | 9/2005 |
| JP | 2007-184735 | 7/2007 |
| JP | 2009-014991 | 1/2009 |
| KR | 10-2001-0006805 | 1/2001 |
| WO | WO-2009/119886 | 10/2009 |

* cited by examiner

AUTHENTICATING A REPLACEABLE PRINTER COMPONENT

CROSS-REFERENCE TO RELATED APPLICATIONS

The present application is a continuation of U.S. application Ser. No. 12/995,034 filed on Nov. 29, 2010 filed under national stage in compliance with 35 U.S.C. 371 which claims the priority under 35 U.S.C. 119(a)-(d) or (f) and under C.F.R. 1.55(a) of previous International Patent Application No.: PCT/US2008/065104, filed May 29, 2008, entitled "Authenticating a Replacement Printer Component", which application is incorporated herein by reference in its entirety.

The present application is also related to PCT Patent Application Serial No. PCT/US2008/065103, entitled "PROVIDING AUTHENTICATED COMMUNICATIONS TO A REPLACEABLE PRINTER COMPONENT," filed on May 29, 2008, which is concurrently being filed as a national stage application in compliance with 35 U.S.C. 371, and is incorporated herein by reference.

BACKGROUND

Current printing systems typically include one or more replaceable printer components, such as inkjet cartridges, inkjet printhead assemblies, toner cartridges, ink supplies, etc. Some existing systems provide these replaceable printer components with on-board memory to communicate information to a printer about the replaceable component, such as ink fill level, marketing information, etc.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following detailed description, reference is made to the accompanying drawings which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

Figure 1:
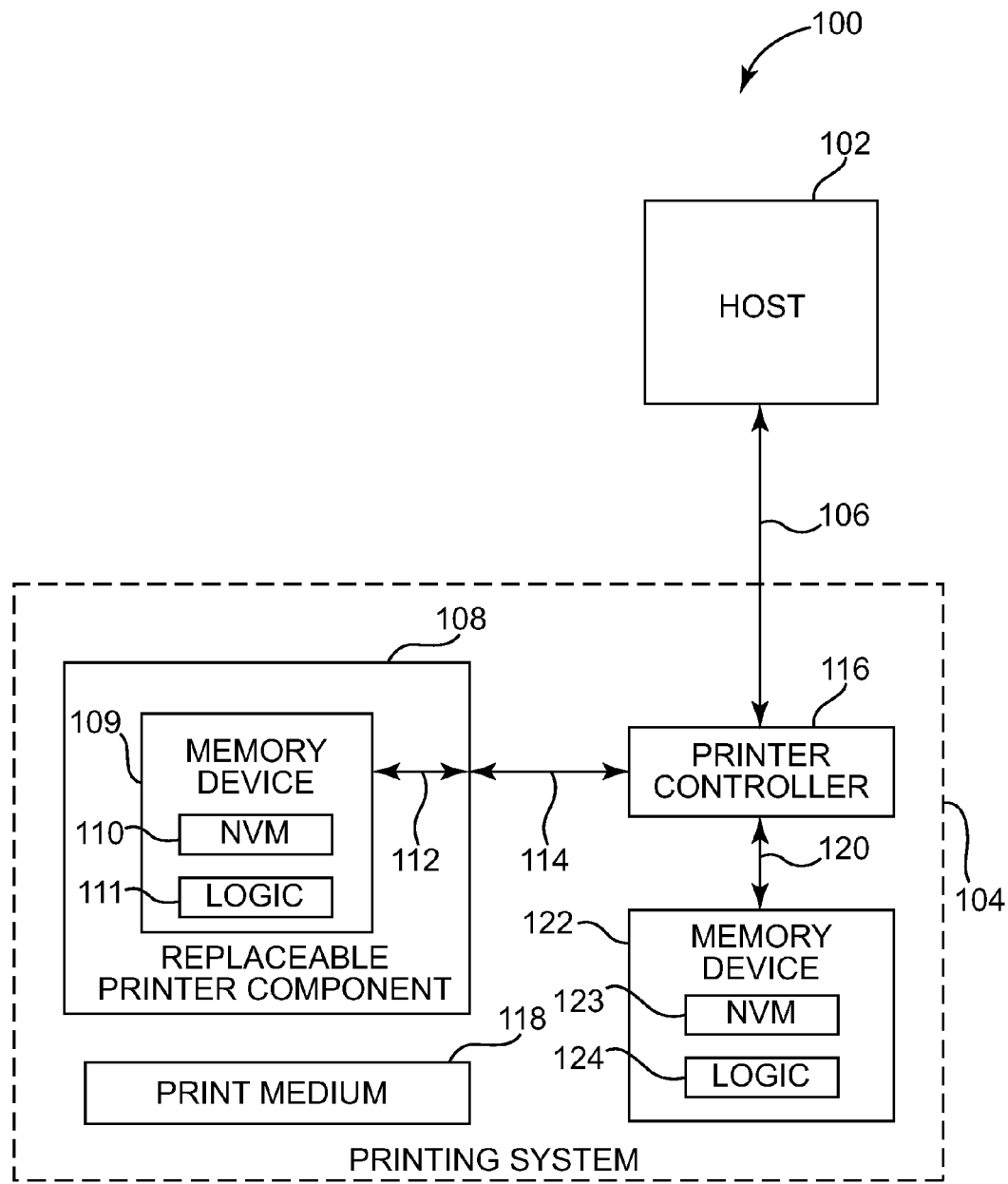
FIG. 1 is a block diagram illustrating one embodiment of a printing arrangement.

FIG. 1 is a block diagram illustrating one embodiment of a printing arrangement 100. Printing arrangement 100 includes a host 102 and a printing system 104. Printing system 104 facilitates printing of graphical and/or textural images on a print medium 118, such as paper, card stock, transparencies, Mylar, cloth, and the like. Printing system 104 includes, for example, an inkjet printer, a laser printer, or other suitable printer. Host 102 communicates with printing system 104 and provides data and/or control signals to printing system 104. Host 102 can be or can be included in a variety of information sources such as a computer, appliance, or other suitable device such as a personal digital assistant (PDA), digital camera, cellular phone, etc.

In one embodiment, printing system 104 includes a printer controller 116, a memory device 122, and a replaceable printer component 108. Replaceable printer component 108 includes a memory device 109. In one embodiment, printer controller 116 determines the authenticity of replaceable printer component 108 based on secret keys stored in memory device 109 and in memory device 122.

Printer controller 116 controls the operation of printing system 104 and, as such, receives data and/or control signals from host 102. Printer controller 116 communicates with host 102 via a communication link 106. Communication link 106 includes, for example, an electrical, optical, infrared, or other suitable information transfer path between printer controller 116 and host 102. Printer controller 116 communicates with memory device 122 via a communication link 120. Communication link 120 includes, for example, an electrical, optical, infrared, or other suitable information transfer path between printer controller 116 and memory device 122.

Memory device 122 includes a non-volatile memory (NVM) 123 and logic 124. In one embodiment, memory device 122 is tamper proof or tamper resistant. In one embodiment, logic 124 is a logic circuit or embedded software running on a processor. For example, in one embodiment, memory device 122 includes a central processing unit (CPU) or system on a chip (SoC) with embedded non-volatile memory 123. In another embodiment, memory device 122 includes a CPU or SoC with external non-volatile memory 123. In another embodiment, memory device 122 includes dedicated logic with internal or external non-volatile memory 123. In another embodiment, memory device 122 is embedded within printer controller 116 with internal or external non-volatile memory 123.

In one embodiment, non-volatile memory 123 is an EEPROM, a FLASH, or another suitable memory. Non-volatile memory 123 stores one or more secret keys used to authenticate replaceable printer component 108. Replaceable printer component 108 is authenticated by authenticating a communication between printer controller 116 and memory device 109 by using session-keys. To generate a session-key, printer controller 116 passes a session-key identifier and a request for a session-key to memory device 122. In response to the session-key identifier and the request for a session-key, logic circuit 124 generates a session-key based on the session-key identifier and a secret key stored in non-volatile memory 123. Logic circuit 124 then provides the generated session-key to printer controller 116.

Replaceable printer component 108 includes a component of printing system 104 that is insertable in and removable from printing system 104. In one embodiment, replaceable printer component 108 includes a consumable component that is disposed of and replaced at an end of a useful life thereof. An example of such a consumable component includes an ink container or a toner cartridge that contains a supply of marking material for printing system 104. The marking material is deposited on print medium 118 by printing system 104 and depleted during a useful life of the ink container or toner cartridge. As such, the ink container or toner cartridge is disposed of and replaced at an end of a useful life thereof or is remanufactured and reused.

In another embodiment, replaceable printer component 108 includes a printing component that is readily replaced in printing system 104. Examples of such a printing component include a printhead that selectively deposits ink on print medium 118 in response to control signals from printer controller 116 or a printer cartridge that includes a printhead and an ink supply. Thus, replaceable printer component 108 may include an ink container, a printhead, or a printer cartridge if, for example, printing system 104 includes an inkjet printer. In addition, replaceable printer component 108 may include a toner cartridge or a developer drum if, for example, printing system 104 includes a laser printer. Further, replaceable printer component 108 may include a peripheral device of printing system 104, such as an Ethernet card, a duplexer, a paper finisher (e.g., stapler, hole punch, etc.), or another suitable device.

Printer controller 116 and replaceable printer component 108 communicate with each other via a communication link 114. Communication link 114 facilitates information transfer between printer controller 116 and replaceable printer component 108 when replaceable printer component 108 is installed in printing system 104. Communication link 114 includes, for example, an electrical, optical, infrared, or other suitable information transfer path between replaceable printer component 108 and printer controller 116.

Replaceable printer component 108 includes a memory device 109 that stores information for replaceable printer component 108 and/or printing system 104. Memory device 109 includes a non-volatile memory (NVM) 110 and logic 111. In one embodiment, memory device 109 is tamper proof or tamper resistant. In one embodiment, logic 111 is a logic circuit or embedded software running on a processor. For example, in one embodiment, memory device 109 includes a CPU or SoC with embedded non-volatile memory 110. In another embodiment, memory device 109 includes a CPU or SoC with external non-volatile memory 110. In another embodiment, memory device 109 includes dedicated logic with internal or external non-volatile memory 110.

In one embodiment, non-volatile memory 110 is a 256-byte or another suitably sized non-volatile memory, such as an EEPROM, a FLASH, or another suitable memory. In one embodiment, non-volatile memory 110 of memory device 109 stores, for example, information that is specific to replaceable printer component 108 and/or information that is applicable to printing system 104. In addition, non-volatile memory 110 can have information to be used by printing system 104 stored therein or can record information for printing system 104. In one embodiment, information that may be stored in non-volatile memory 110 includes operational and/or non-operational parameters for replaceable printer component 108 and/or printing system 104.

Non-volatile memory 110 also stores a value in a data field that indicates that replaceable printer component 108 is genuine. In addition, non-volatile memory 110 stores one or more secret keys used to authenticate replaceable printer component 108. In one embodiment, the one or more secret keys stored in non-volatile memory 110 of memory device 109 are derived from the one or more secret keys stored in non-volatile memory 123 of memory device 122. In other embodiments, the one or more secret keys stored in non-volatile memory 110 of memory device 109 and the one or more secret keys stored in non-volatile memory 123 of memory device 122 are derived from one or more common secret keys. As such, the one or more secret keys stored in non-volatile memory 110 are related to the one or more secret keys stored in non-volatile memory 123.

In one embodiment, replaceable printer component 108 includes a communication link 112 that electrically couples or communicatively couples memory device 109 with communication link 114 and, therefore, with printer controller 116 when replaceable printer component 108 is installed in printing system 104. As such, when replaceable printer component 108 is installed in printing system 104, memory device 109 communicates with printer controller 116 via communication links 112 and 114. Thus, communication links 112 and 114 include, for example, electrical couplings or connections such as electrical contacts or pins that mate with corresponding electrical nodes or receptacles, respectively.

Replaceable printer component 108 is authenticated by authenticating a communication between printer controller 116 and memory device 109 by using session-keys. To generate a session-key, printer controller 116 passes a request for a session-key identifier to memory device 109. In response to the request for a session-key identifier, logic circuit 111 of memory device 109 generates a session-key identifier and an associated session-key based on a secret key stored in non-volatile memory 110. In one embodiment, logic circuit 111 of memory device 109 generates a different session-key identifier and an associated session-key in response to each request for a session-key identifier. Therefore, each session-key identifier and each associated session-key is used only once. Logic circuit 111 provides the generated session-key identifier to printer controller 116, which in turn passes the session-key identifier to memory device 122 as previously described above.

Figure 2:
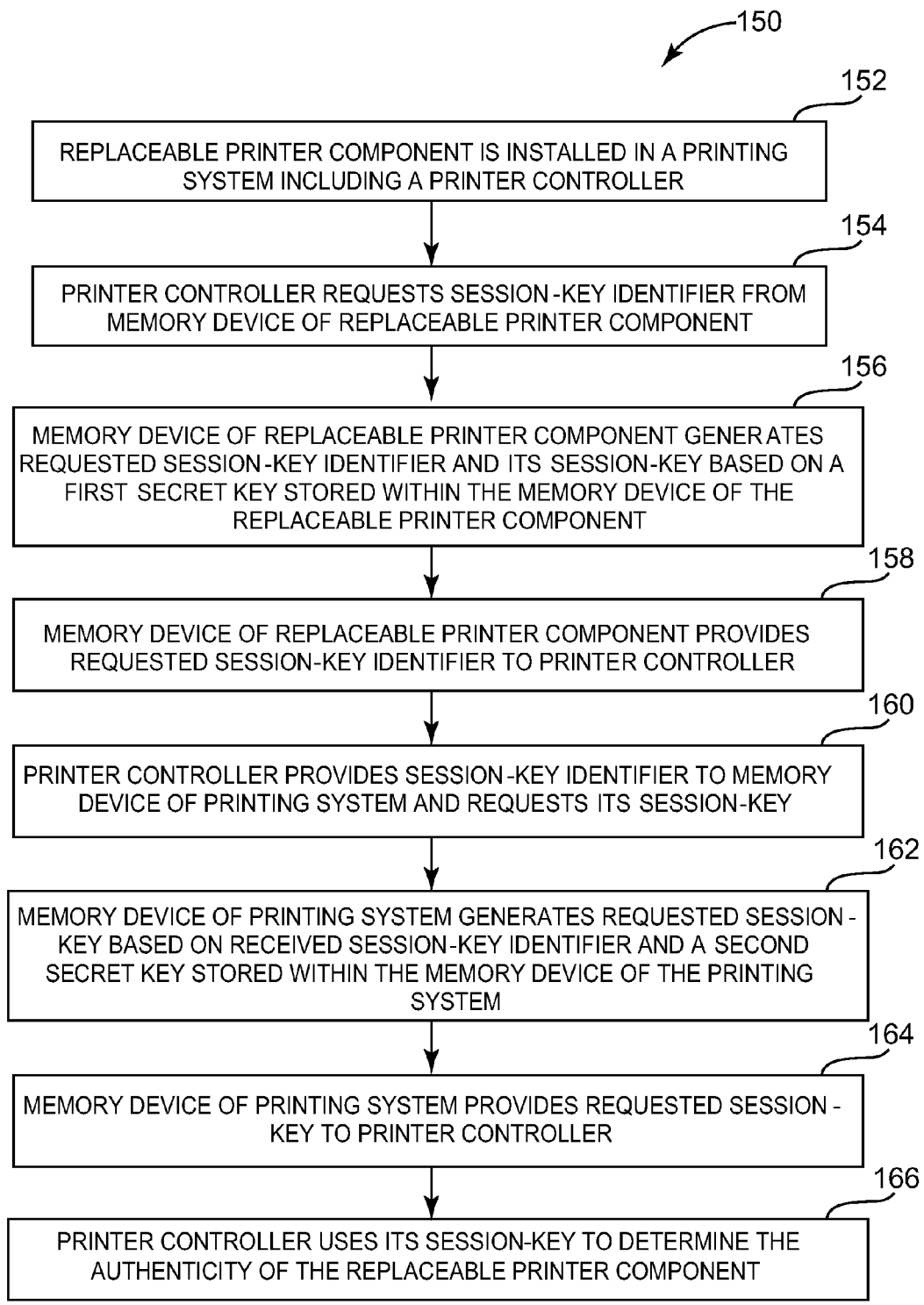
FIG. 2 is a flow diagram illustrating one embodiment of a method for authenticating a replaceable printer component.

FIG. 2 is a flow diagram illustrating one embodiment of a method 150 for authenticating a replaceable printer component 108. At 152, a replaceable printer component 108 is installed in a printing system 104 including a printer controller 116. The replaceable printer component 108 includes a memory device 109 that has been configured with one or more secret keys for authenticating replaceable printer component 108. The printing system 104 also includes a memory device 122 that has been configured with one or more secret keys for authenticating replaceable printer component 108.

At 154, printer controller 116 requests a session-key identifier from memory device 109 of replaceable printer component 108 through communication links 114 and 112. In one embodiment, printer controller 116 uses a random challenge in requesting the session-key identifier to prevent replay attacks against printer controller 116. At 156, in response to receiving the request for a session-key identifier, logic circuit 111 of memory device 109 generates the requested session-key identifier and its associated session-key based on a first secret key stored within non-volatile memory 110. At 158, logic circuit 111 of memory device 109 provides the requested session-key identifier to printer controller 116.

At 160, printer controller 116 provides the session-key identifier received from memory device 109 to memory device 122 through communication link 120 and requests a session-key. At 162, in response to receiving the session-key identifier and the request for a session-key, logic circuit 124 of memory device 122 generates the requested session-key based on the received session-key identifier and a second secret key stored in non-volatile memory 123. If the first secret key stored in non-volatile memory 110 of memory device 109 is related to the second secret key stored in non-volatile memory 123 of memory device 122, then the session-key generated by logic circuit 111 matches the session-key generated by logic circuit 124. At 164, logic circuit 124 of memory device 122 provides the requested session-key to printer controller 116. At 166, printer controller 116 uses the received session-key to determine the authenticity of replaceable printer component 108.

Figure 3:
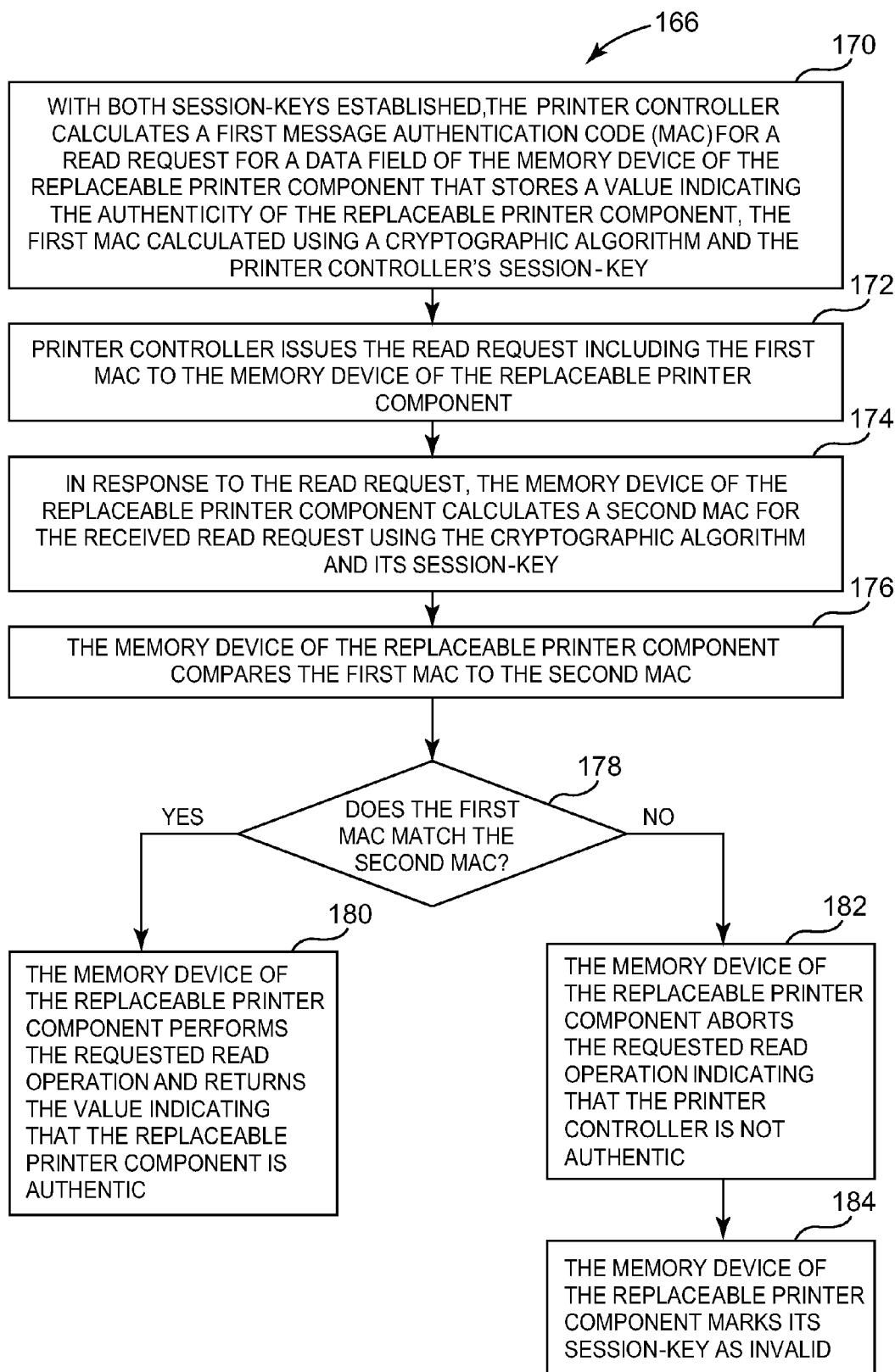
FIG. 3 is a flow diagram illustrating one embodiment of a method for authenticating a read request issued by a printing system for a data value indicating the authenticity of a replaceable printer component.

FIG. 3 is a flow diagram illustrating one embodiment of a method 166 for authenticating a read request issued by a printing system 104 for a data value indicating the authenticity of a replaceable printer component 108. At 170, with a session-key established in memory device 109 of replaceable printer component 108 and with a session-key established in printing system 104, printer controller 116 calculates a first message authentication code (MAC) for a read request using its session-key and a suitable cryptographic algorithm. The read request is for a data field of non-volatile memory 110 that stores a value indicating whether replaceable printer component 108 is genuine. The first MAC is calculated over the command and command parameters of the read request.

In one embodiment, the first MAC is calculated based on a hash message authentication code (HMAC) with a secure hash such as secure hash algorithm one (SHA-1), SHA-2, or other suitable secure hash algorithm. In another embodiment, the first MAC is calculated based on a cipher-based MAC (CMAC) with a cipher block algorithm such as data encryption standard (DES), 3DES, advanced encryption standard (AES), Rivest cipher two (RC2), or other suitable cipher block algorithm. In other embodiments, the first MAC is calculated using another suitable technique.

At 172, printer controller 116 issues the read request including the first MAC to memory device 109 of replaceable printer component 108. At 174, in response to the read request, logic circuit 111 of memory device 109 calculates a second MAC for the received read request using its session-key and the cryptographic algorithm. At 176, logic circuit 111 of memory device 109 compares the received first MAC to the calculated second MAC.

At 178, if the first MAC does not match the second MAC, then the session-key of memory device 109 does not match the session-key of printing system 104. Therefore, the communication between memory device 109 and printer controller 116 is not authenticated. At 182, logic circuit 111 of memory device 109 aborts or denies the requested read operation. By denying the requested read operation, replaceable printer component 108 has determined that printer controller 116 is not authentic. Therefore, replaceable printer component 108 does not communicate with printer controller 116. At 184, logic circuit 111 of memory device 109 marks its session-key as invalid such that it cannot be used again.

At 178, if the first MAC matches the second MAC, then the session-key of memory device 109 matches the session-key of printing system 104. Therefore, the communication between memory device 109 and printer controller 116 is authenticated. At 180, logic circuit 111 of memory device 109 performs the requested read operation. In response to the read operation, memory device 109 returns a response including the value of the data field indicating that replaceable printer component 108 is genuine.

Figure 4:
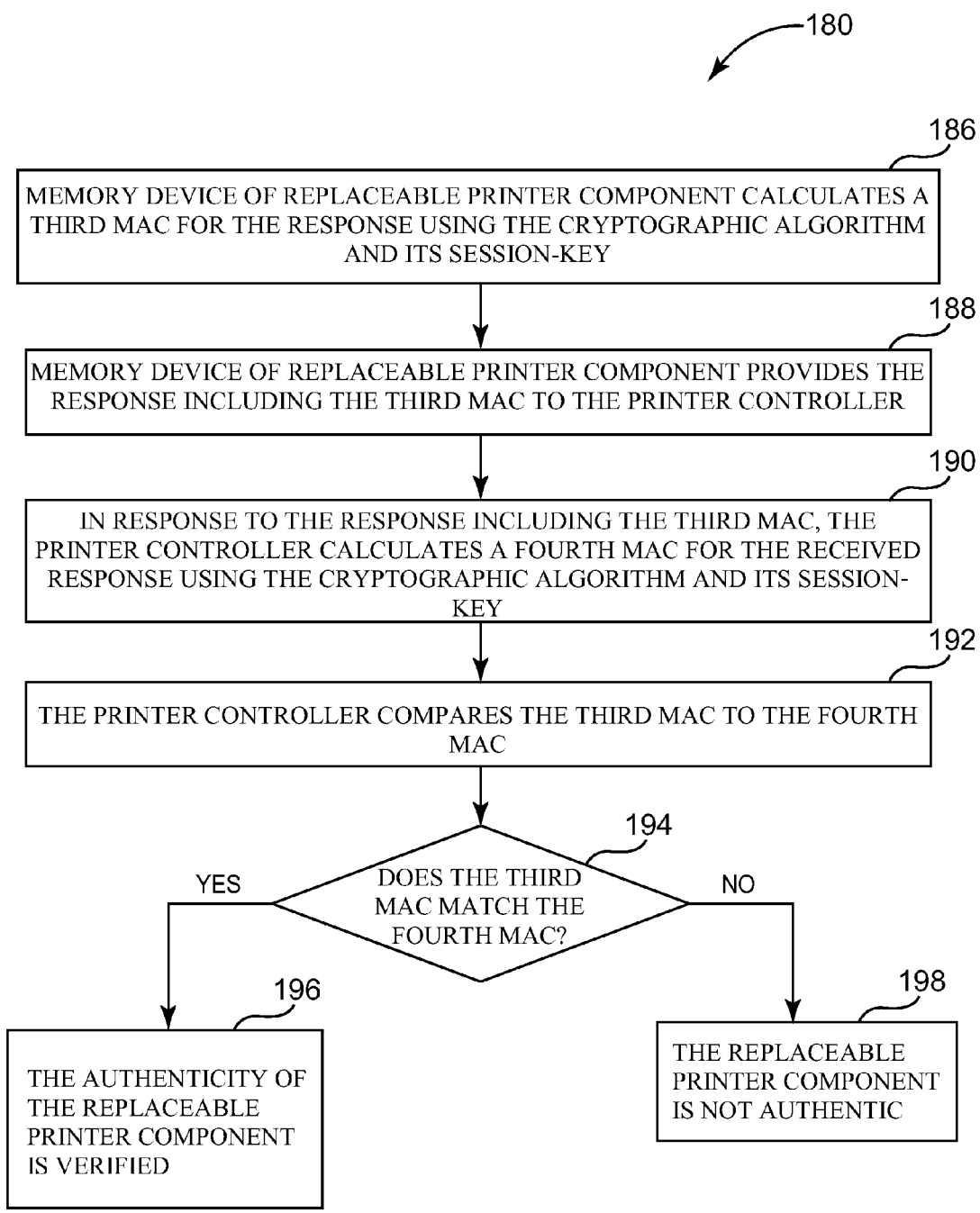
FIG. 4 is a flow diagram illustrating one embodiment of a method for authenticating a response from a replaceable printer component.

FIG. 4 is a flow diagram illustrating one embodiment of a method 180 for authenticating a response from replaceable printer component 108. At 186, memory device 109 calculates a third MAC for the response using its session-key and the cryptographic algorithm. The third MAC is calculated over the command MAC and response data. At 188, memory device 109 provides the response including the third MAC to printer controller 116. At 190, in response to the response from memory device 109, printer controller 116 calculates a fourth MAC for the received response using its session-key and the cryptographic algorithm. At 192, printer controller 116 compares the received third MAC to the calculated fourth MAC.

At 194, if the third MAC does not match the fourth MAC, then the session-key of printing system 104 does not match the session-key of memory device 109. Therefore, the communication between printer controller 116 and memory device 109 is not authenticated. Thus, at 198 printer controller 116 determines that replaceable printer component 108 is not authentic.

At 194, if the third MAC matches the fourth MAC, then the session-key of printing system 104 matches the session-key of memory device 109. Therefore, the communication between printer controller 116 and memory device 109 is authenticated. Since the communication between memory device 109 and printer controller 116 has been authenticated, printer controller 116 can trust the value returned in response to the read request. Therefore, at 196 printer controller 116 determines that replaceable printer component 108 is authentic.

Embodiments provide a printing system into which a replaceable printer component can be installed. Printing system embodiments include a memory device storing one or more secret keys. Replaceable printer component embodiments include a memory device storing one or more secret keys related to the one or more secret keys stored in the memory device of the printing system embodiments. The one or more secret keys stored in the printing system embodiments and in the replaceable printer component embodiments are used to authenticate the replaceable printer component embodiments. Therefore, the use of counterfeit replaceable printer components in the printing system embodiments is prevented.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:
1. A replaceable printer component comprising:
a first memory device configured to store a first secret and a value indicating that the replaceable printer component is genuine; and a communication link configured to communicatively link the first memory device to a printer controller when the replaceable printer component is installed in a printing system;

wherein the replaceable printer component is programmed to grant a read request of said value from a printing system in which said replaceable printer component is installed only if that read request is based on a legitimate session key established for a communication session with the printing system, wherein the legitimate session key is based on the first secret and a second secret of the printing system;

wherein the first memory device is configured to generate a session-key identifier and a first session-key based on the first secret and provide the session-key identifier to the printing system in response to a request to establish a communication session;

wherein the first memory device is configured to receive the read request for the value indicating the authenticity of the replaceable printer component, the read request including a first message authentication code calculated using a second session-key from the printing device, and wherein the first memory device is configured to calculate a second message authentication code based on the read request and the first session-key, and perform the read request only in response to the second message authentication code matching the first message authentication code; and wherein the first memory device is configured to deny the read request and to mark the first session-key as invalid in response to the second message authentication code not matching the first message authentication code.

2. The replaceable printer component of claim 1, wherein the first secret is derived from the second secret.

3. The replaceable printer component of claim 1, wherein the first memory device is configured to perform the read request by providing a response including a third message authentication code calculated using the first session-key.

4. The replaceable printer component of claim 1, wherein the first memory device is configured to generate a different session-key identifier and session-key in response to each request to establish a communication session.

5. The replaceable printer component of claim 1, wherein the first memory device is tamper resistant.

6. The replaceable printer component of claim 1, wherein the replaceable printer component comprises one of an inkjet cartridge, an inkjet printhead assembly, a toner cartridge, and an ink supply.

7. The replaceable printer component of claim 1, wherein the replaceable printer component prevents replay attacks by receiving a random challenge in a request for a session key identifier from the printing system.

8. The replaceable printer component of claim 7, wherein the first memory device is configured to deny the read request and to mark the first session-key as invalid in response to the second message authentication code not matching the first message authentication code.

9. The replaceable printer component of claim 7, wherein the first secret is derived from the second secret.

10. The replaceable printer component of claim 7, wherein the first memory device is configured to perform the read request by providing a response including a third message authentication code calculated using the first session-key.

11. The replaceable printer component of claim 7, wherein the first memory device is configured to generate a different session-key identifier and session-key in response to each request to establish a communication session.

12. The replaceable printer component of claim 7, wherein the first memory device is tamper resistant.

13. The replaceable printer component of claim 7, wherein the replaceable printer component comprises one of an inkjet cartridge, an inkjet printhead assembly, a toner cartridge, and an ink supply.

* * * * *